US012783636B2

(12) United States Patent
Chiueh et al.

(10) Patent No.: US 12,783,636 B2
(45) Date of Patent: Nov. 3, 2026

(54) AUTOMATIC SYSTEM UPDATING APPARATUS

(71) Applicant: DELTA ELECTRONICS, INC., Taoyuan City (TW)

(72) Inventors: Tzi-Cker Chiueh, Taoyuan City (TW); Lap-Chung Lam, Taoyuan City (TW); Li-Ting Huang, Taoyuan City (TW); Hsuan-Lin Cheng, Taoyuan City (TW); Xu-Kang Wu, Taoyuan City (TW); Dong-Shen Wu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 50 days.

(21) Appl. No.: 18/926,255

(22) Filed: Oct. 24, 2024

(65) Prior Publication Data

US 2025/0139226 A1 May 1, 2025

(30) Foreign Application Priority Data

Oct. 26, 2023 (CN) ........................ 202311398938.9

(51) Int. Cl.
*G06F 21/45* (2013.01)

(52) U.S. Cl.
CPC .................................. *G06F 21/45* (2013.01)

(58) Field of Classification Search
CPC ........ G06F 21/45; G06F 21/51; G06F 21/566; G06F 8/65
See application file for complete search history.

(56) References Cited

U.S. PATENT DOCUMENTS

| | | | | |
|---|---|---|---|---|
| 2009/0165131 | A1* | 6/2009 | Treadwell | G06F 21/52 726/22 |
| 2016/0224791 | A1* | 8/2016 | Yamamoto | G06F 21/566 |
| 2021/0192058 | A1* | 6/2021 | Stopel | G06F 21/53 |
| 2023/0171273 | A1* | 6/2023 | Vaidya | H04L 63/105 726/23 |
| 2023/0325501 | A1* | 10/2023 | Chhetri | G06F 21/53 726/24 |
| 2024/0303062 | A1* | 9/2024 | Verma | G06F 8/65 |
| 2024/0346131 | A1* | 10/2024 | Cheng | G06F 21/604 |

* cited by examiner

*Primary Examiner* — Sangseok Park
(74) *Attorney, Agent, or Firm* — CKC & Partners Co., LLC

(57) ABSTRACT

An automatic system updating apparatus and method are provided, which identifies the event of system update and collects the updating results to the allowlist. The apparatus determines whether at least one pending event intercepted from a file system belongs to a system update event based on a plurality of update rules. The apparatus executes the at least one pending event and generates at least one executable file corresponding to the at least one pending event in response to the at least one pending event belonging to the system update event, and the new generated at least one executable file is not included in an allowlist. The apparatus adds the at least one executable file corresponding to the at least one pending event to the allowlist based on a security setting.

19 Claims, 7 Drawing Sheets

PFUR

| | | | |
|---|---|---|---|
| **UI**<br>KB* | **EA**<br>LocalSystem | **PR**<br>msiexec.exe | **PF**<br>%WINDIR%\SoftwareDistribution\Download*\Windows10.0-KB*-x64.msi |
| **UI**<br>KB* | **EA**<br>LocalSystem | **PR**<br>dism.exe | **PF**<br>%ProgramFiles%\CUAssistant\Download\Windows10.0-KB*-x64.cab |

PUR

| | | |
|---|---|---|
| **UI**<br>KB* | **EA**<br>LocalSystem | **PR**<br>%WINDIR%\SoftwareDistribution\Download\Install\Windows-KB*-x64 -V5.102.exe |
| **UI**<br>SecurityUpdate | **EA**<br>LocalSystem | **PR**<br>%WINDIR%\ServiceProfiles\NetworkService\AppData\Local\Temp\mpam-*.exe |

FIG. 5A

AUTOMATIC SYSTEM UPDATING APPARATUS

CROSS-REFERENCE TO RELATED APPLICATION

This application claims priority to China Application Serial Number 202311398938.9 filed Oct. 26, 2023, which is herein incorporated by reference in its entirety.

BACKGROUND

Field of Invention

The present invention relates to an automatic system updating apparatus. More particularly, the present disclosure relates to an automatic system updating apparatus and method for identifying system updates and automatically updating an allowlist.

Description of Related Art

During system operations, for systems with higher information security requirements, allowlist inspection methods will be used to filter executable files, which can work well in a fixed software environment.

Specifically, the allowlist only allows the device to execute executable files listed on the positive list (e.g., Application Allowlisting), and does not allow the device to execute unknown executable files to ensure that only trusted software can be executed, thereby blocking attacks by malicious software.

However, when performing a new system update, it is expected that new system files will be generated. If the newly generated executable files are not in the allowlist as a result of the system update, the device will not be able to successfully execute the new files, causing the system to fail to operate smoothly, and the allowlist needs to be updated manually.

However, unconditional trust in all new changes will also bring security concerns. It is necessary to avoid new files of unknown software from being mixed in. Accordingly, there is an urgent need for a reliable technology that can identify system updates and automatically update the allowlist.

SUMMARY

An objective of the present disclosure is to provide an automatic system updating apparatus. The automatic system updating apparatus comprises a storage and a processor. The processor is electrically connected to the storage. The storage is configured to store an allowlist. The processor determines whether at least one pending event intercepted from a file system belongs to a system update event based on a plurality of update rules. The processor generates at least one executable file corresponding to the at least one pending event in response to the at least one pending event belonging to the system update event, wherein the at least one executable file is not included in the allowlist. The processor adds the at least one executable file corresponding to the at least one pending event to the allowlist based on a security setting.

Another objective of the present disclosure is to provide an automatic system updating apparatus. The automatic system updating apparatus comprises a storage and a processor. The processor is electrically connected to the storage. The storage is configured to store an allowlist. The processor determines whether at least one pending event intercepted from a file system belongs to a major system update event based on a plurality of update rules. In response to the at least one pending event belonging to the major system update event, the processor mounts and scans an environment repairing image file generated from executing an update execution file or command corresponding to the at least one pending event. The processor adds a plurality of mapping executable files included in the environment repairing image file to the allowlist, wherein the mapping executable files are not included in the allowlist.

Another objective of the present disclosure is to provide an automatic system updating method, which is adapted for use in an electronic apparatus, and the electronic apparatus stores an allowlist. The automatic system updating method comprises the following steps: determining whether at least one pending event intercepted from a file system belongs to a system update event based on a plurality of update rules; generating at least one executable file corresponding to the at least one pending event in response to the at least one pending event belonging to the system update event, wherein the at least one executable file is not included in the allowlist; and adding the at least one executable file to the allowlist based on a security setting.

According to the above descriptions, the automatic system updating technology (at least including the apparatus and the method) provided by the present disclosure determines whether a pending event corresponds to a system update event by analyzing the behavioral characteristics of the pending event. Then, the automatic system updating technology provided by the present disclosure can execute the executable file or command corresponding to the pending event. In addition, the automatic system updating technology provided by the present disclosure can add the executable files generated by the pending event to the allowlist based on the security settings, so that when the system subsequently executes the at least one executable file, the executable file can be passed through the allowlist check. Since the automatic system updating technology provided by the present disclosure can identify system updates and automatically update the allowlist, it solves the shortcomings of the conventional technology.

The detailed technology and preferred embodiments implemented for the subject disclosure are described in the following paragraphs accompanying the appended drawings for people skilled in this field to well appreciate the features of the claimed disclosure.

BRIEF DESCRIPTION OF THE DRAWINGS

FIG. 5A is a schematic view depicting pending update rules of some embodiments;

DETAILED DESCRIPTION

In the following description, an automatic system updating apparatus and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
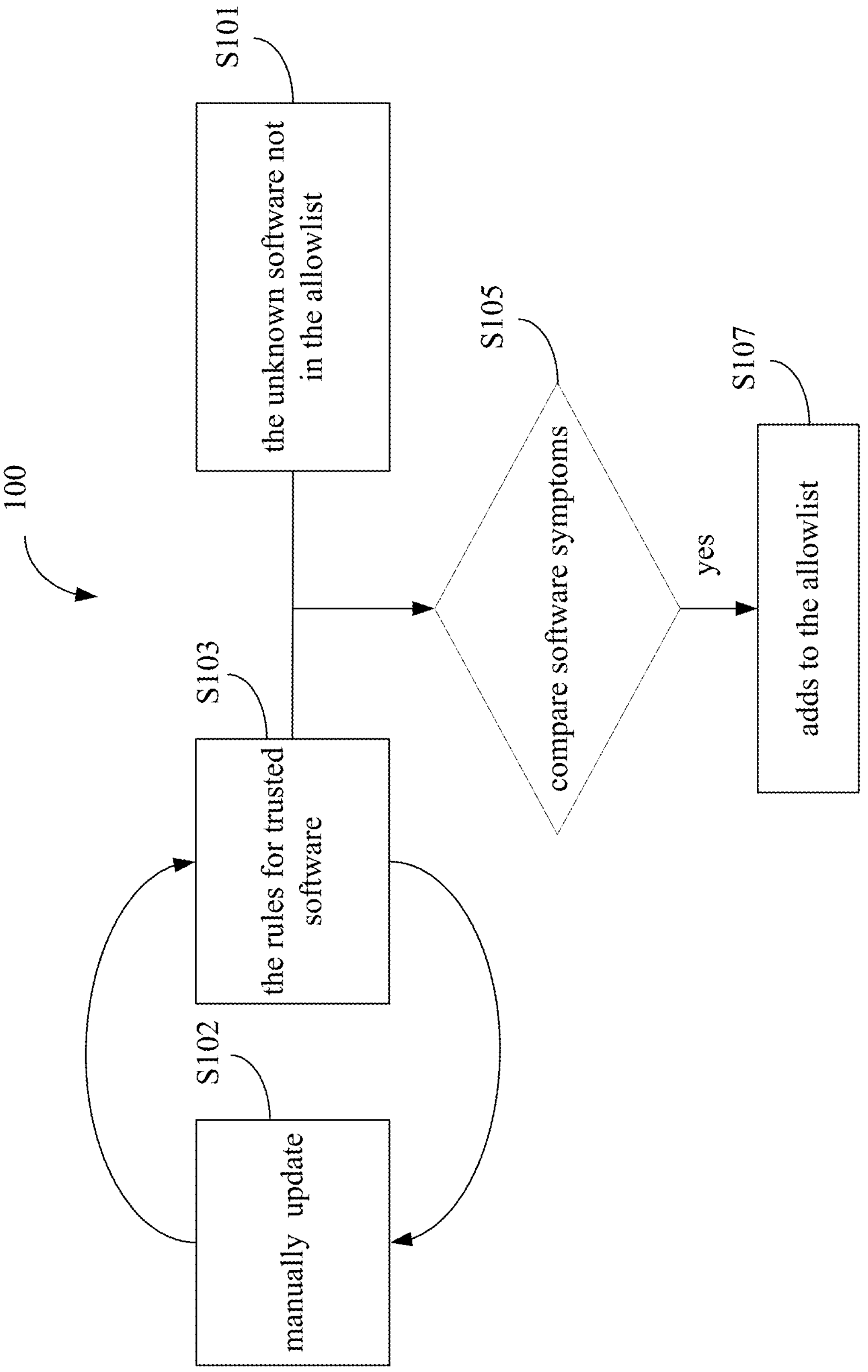
FIG. 1 is a schematic view depicting the updating operation of the existing technology.

First, for ease of understanding, a brief description of the operation method of system updating in the prior art is provided. Please refer to the updating operation schematic diagram 100 in FIG. 1. As shown in FIG. 1, when the apparatus detects a system update, a plurality of new executable file will be generated after the update. When an unknown executable file that is not in the allowlist is to be executed, it cannot be executed directly because the unknown executable file is not in the allowlist, making the system unable to operate smoothly. Therefore, in such a situation, additional manual inspection is required to compare software symptoms (i.e., operation S105) based on manually setting the rules for trusted software (i.e., operation S103). When it is determined that the executable file complies with the trusted rules, the executable file is manually added to the allowlist (i.e., operation S107). However, since the rules for trusted software need to be updated and maintained manually (i.e., operation S102), they cannot be updated automatically in real time.

Figure 2:
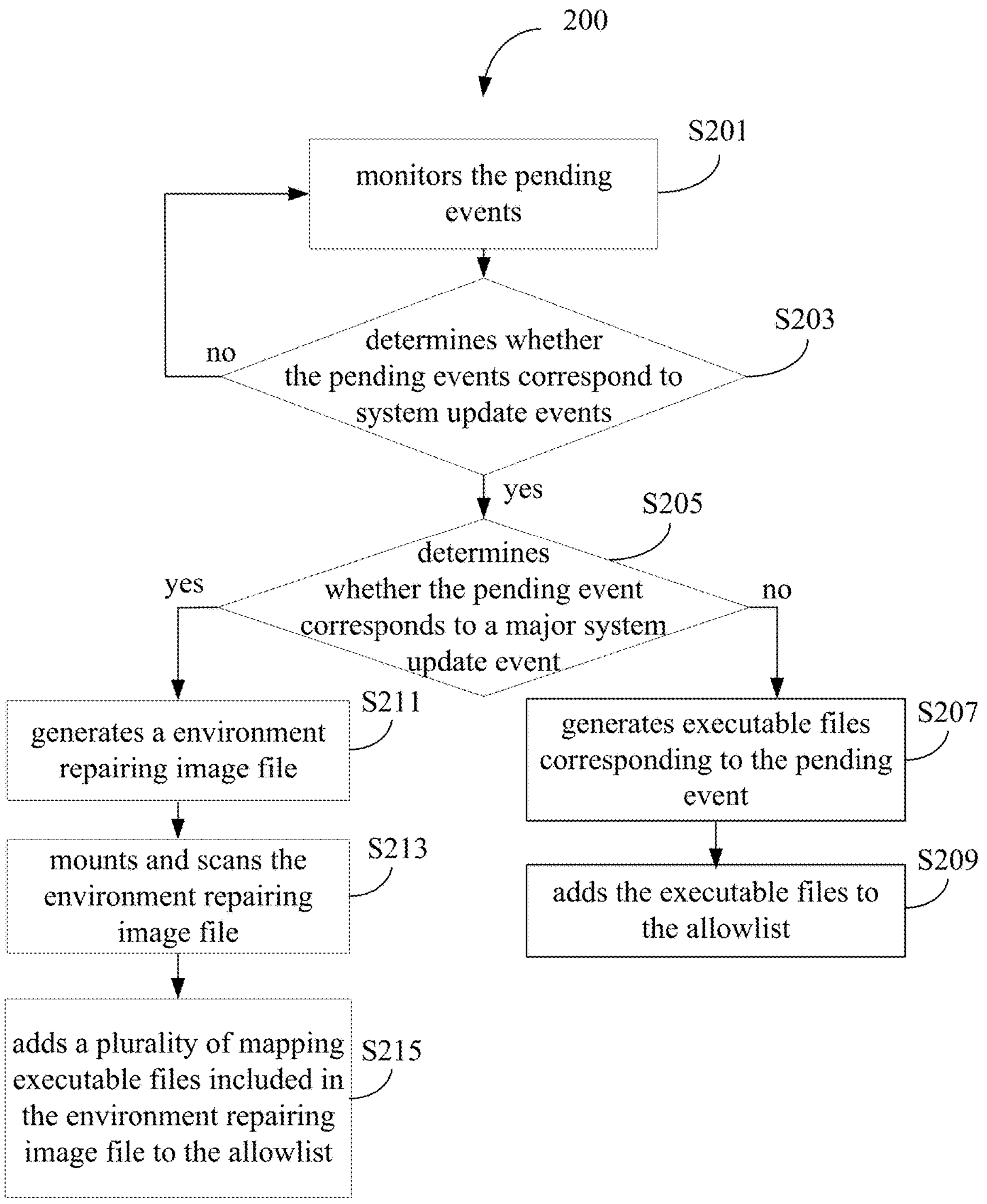
FIG. 2 is a schematic view depicting the updating operation of some embodiments.

Next, for a brief description of an operation method of system updating in the present disclosure, please refer to the updating operation schematic diagram 200 in FIG. 2. As shown in FIG. 2, the present disclosure continuously monitors the pending events of the file system through the monitoring program (i.e., operation S201), and determines whether the pending events correspond to system update events (i.e., operation S203). When the judgment result is no, the monitoring program continues to monitor other pending events of the file system. In addition, when the judgment result is yes, it is further determined whether the pending event corresponds to a major system update event (i.e., operation S205).

Next, when the judgment result of operation S205 is no, executable files corresponding to the pending event are generated (i.e., operation S207), and then the executable files are added to the allowlist (i.e., operation S209).

In addition, when the judgment result of operation S205 is yes, operation S211 is executed to execute an update execution file or command corresponding to the pending event to generate an environment repairing image file (that is a collection of tools preferably with a graphical interface that can repair a computer, or reinstall it from saved images, for example: Winre.wim or Windows RE image file or Windows Recovery Environment image file) corresponding to the pending event (i.e., the update comes with complete system files, and the updated system has not yet overwritten the running system). Next, the present disclosure mounts the environment repairing image file and scans the files therein (i.e., operation S213). Then, a plurality of mapping executable files included in the environment repairing image file are added to the allowlist (i.e., operation S215) to update the allowlist before the running system is replaced. The aforementioned mapping executable file means the executable file taken from the environment repairing image file, that is, the mapped executable file is a part of the updated system.

Figure 3:
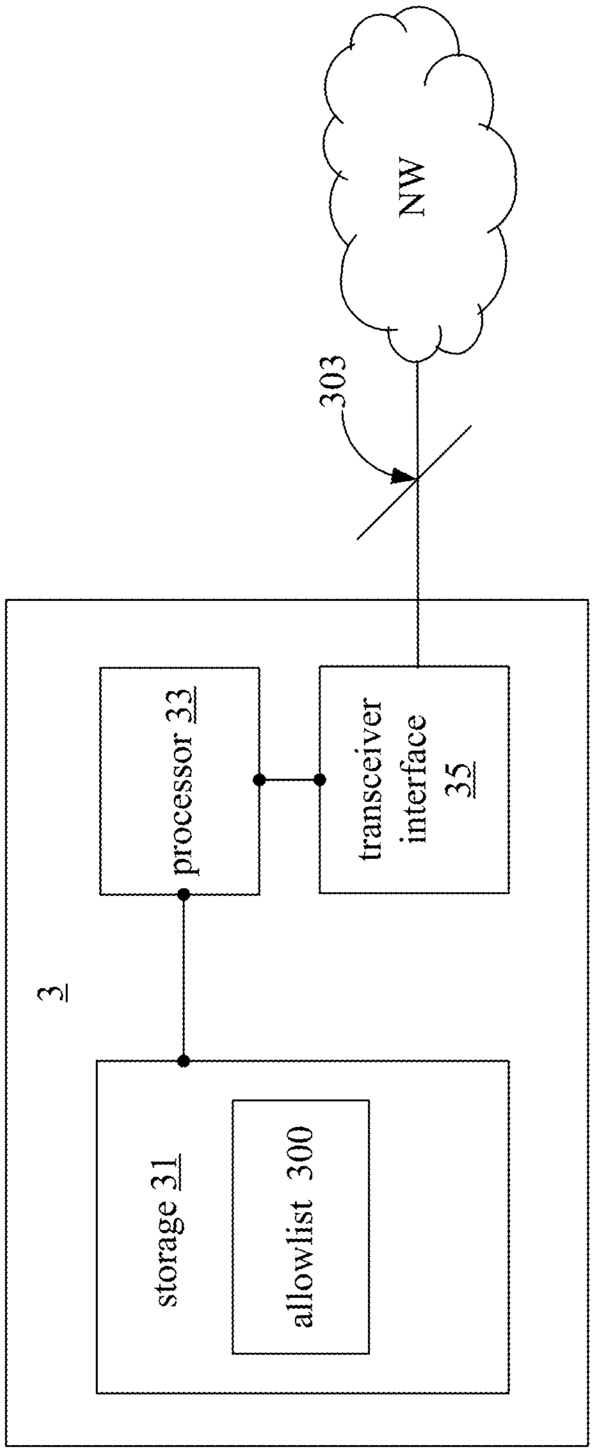
FIG. 3 is a schematic view depicting the architecture and environment of the automatic system updating apparatus of the first embodiment.

Next, the following paragraphs will describe the application environment of the present disclosure, please refer to FIG. 3. As shown in FIG. 3, the automatic system updating apparatus 3 receives system update content 303 (e.g., update package, installation package, etc.) used to update its apparatus, and the automatic system updating apparatus 3 determines whether update result corresponding to the system update content 303 can be collected. For example, the automatic system updating apparatus 3 can receive system update content 303 from a network NW (e.g., an internal network or an external network).

It shall be appreciated that FIG. 3 is only used to illustrate one aspect of the present disclosure. The present disclosure does not limit the source of the system update content 303, any method by which the automatic system updating apparatus 3 receives the system update content 303 and performs system update should fall within the scope of the present disclosure.

The schematic structural diagram of the automatic system updating apparatus 3 according to the first embodiment of the present disclosure is depicted in FIG. 3. The automatic system updating apparatus 3 comprises a storage 31, a processor 33, and a transceiver interface 35. The processor 33 is electrically connected to the storage 31 and the transceiver interface 35.

It shall be appreciated that the storage 31 may be a memory, a Universal Serial Bus (USB) disk, a hard disk, a Compact Disk (CD), a mobile disk, or any other storage medium or circuit known to those of ordinary skill in the art and having the same functionality. The transceiver interface 35 is an interface capable of receiving and transmitting data or other interfaces capable of receiving and transmitting data and known to those of ordinary skill in the art. The processor 33 may be any of various processors, Central Processing Units (CPUs), microprocessors, digital signal processors or other computing apparatuses known to those of ordinary skill in the art.

In the present embodiment, the storage 31 is configured to store an allowlist 300. It shall be appreciated that the allowlist 300 records the files that are allowed to be executed and properties of the corresponding files, such as file name, size, created time, etc. In some embodiments, the allowlist 300 may further record a file fingerprint of the corresponding file.

In some embodiments, the allowlist 300 can be generated by the automatic system updating apparatus 3 itself. In some embodiments, the allowlist 300 can be directly obtained by external devices (for example, multiple devices jointly maintain and update the allowlist 300).

In the present embodiment, the processor 33 continuously monitors the operation process of a file system (for example: Windows File System). In addition, the processor 33 can intercept an event that is about to be executed (hereinafter referred to as a pending event) from the file system, and analyze the behavioral characteristics of the pending event to determine whether the pending event is a system update event.

In addition, when the processor 33 has determined that the pending event is a system update event, the processor 33 needs to perform the following automatic system updating determination operation.

Specifically, the processor 33 determines whether the pending event intercepted from the file system corresponds to a system update event based on a plurality of update rules. It shall be appreciated that the processor 33 can sequentially process one or a plurality of pending events (i.e., at least one pending event). For convenience of explanation, the processor 33 will execute one pending event as an explanation below. A person with ordinary skill in the art should be able to understand the operation of the plurality of pending events based on the description of the present disclosure.

It shall be appreciated that each of these update rules is a rule generated by the processor 33 analyzing the behavioral characteristics of the system when updating. For example, behavioral characteristics can include specific executors (for example: system account "LocalSystem", system account "LocalService"), specific processes, specific package file paths, and specific locations where new files are stored.

In some embodiments, the update rules are generated by the processor 33 analyzing a plurality of historical system update events of the file system. For example, the processor 33 obtains a plurality of historical system update events from the file system. Then, the processor 33 extracts the historical behavior characteristics from each of the historical system update events to generate the update rules.

Figure 4:
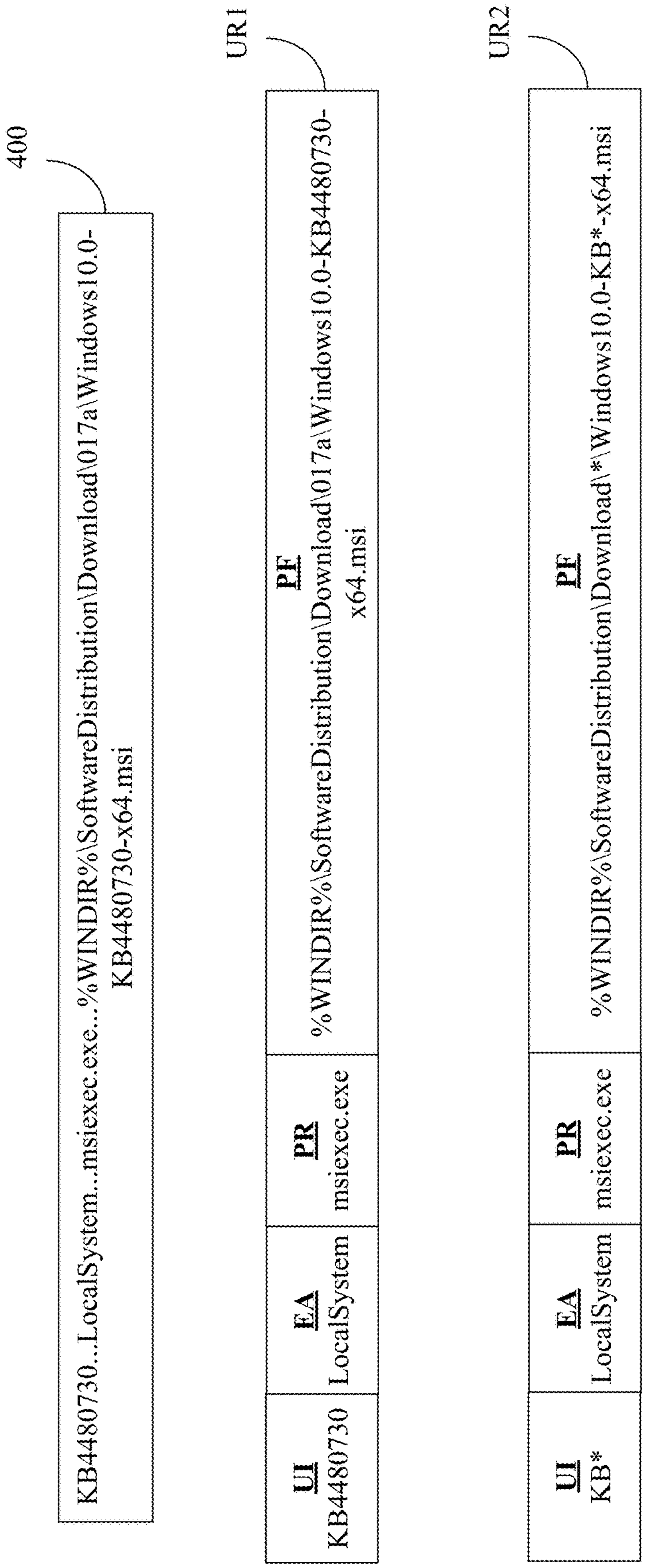
FIG. 4 is a schematic view depicting pending events and update rules in the first embodiment.

To facilitate understanding, a practical example is used for illustration, please refer to FIG. 4. In FIG. 4, the pending event 400 is a known historical system update event. The pending event 400 comprises original information corresponding to the pending event, such as update items, execution accounts, processes, package file paths, etc.

In the present example, the processor 33 analyzes the content of the pending event 400 and generates an update rule UR1 corresponding to the pending event 400. In the present example, the update rule UR1 comprises fields such as the update item Ul, the execution account EA, the process PR, and the package file PF. The update item Ul corresponds to "KB4480730", the execution account EA corresponds to "LocalSystem", and the process PR corresponds to "msiexec.exe", and the package file PF corresponds to "% WINDIR %\SoftwareDistribution\Download\017a\Windows10.0-KB4480730-x 64.msi".

In some embodiments, the processor 33 further replaces the name in the path with the wildcard character "*" to cover more update items of the same type. For example, the processor 33 replaces "4480730" and "017a" in the update rule UR1 with "*" and generates the update rule UR2.

In some embodiments, the update rules comprise at least one of a process update rule, a system service update rule, a command line update rule, and a package file update rule or a combination thereof.

Figure 5B:
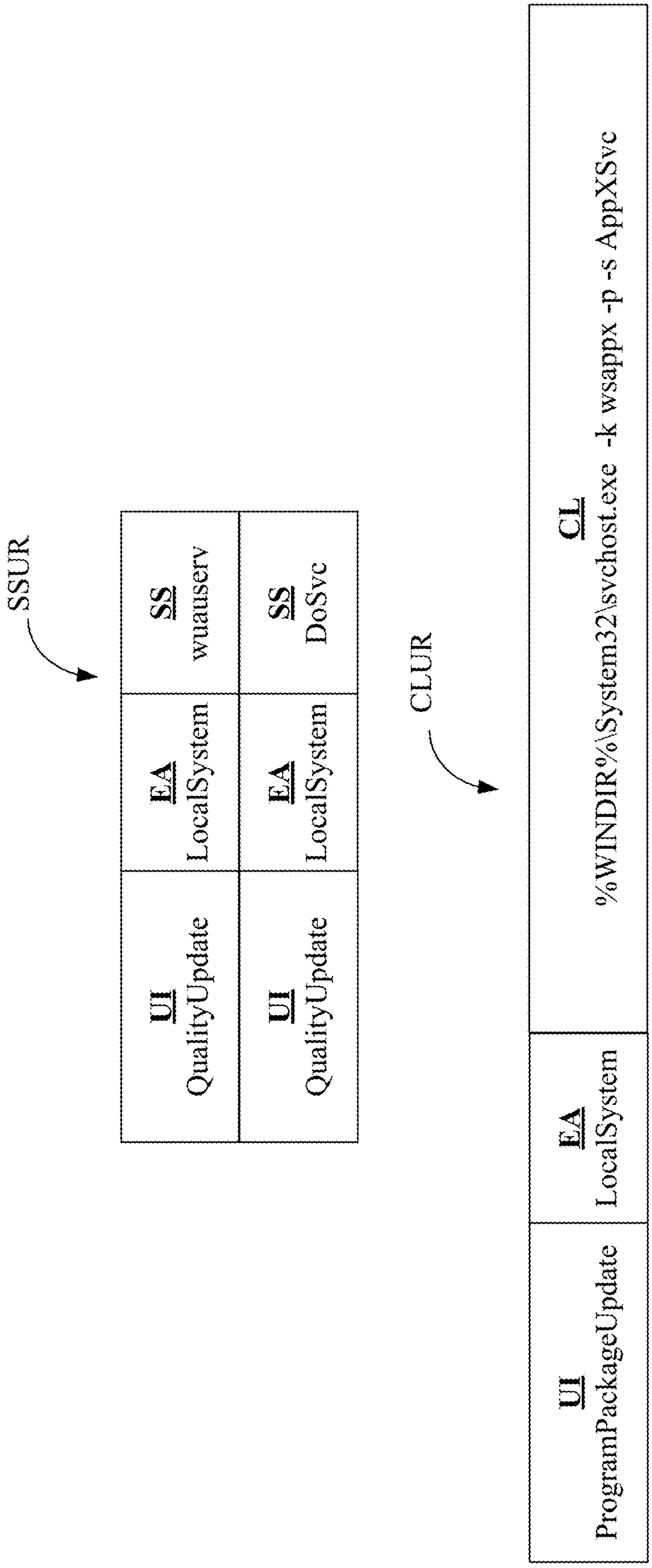
FIG. 5B is a schematic view depicting pending update rules of some embodiments.

For ease of understanding, a practical example is used for illustration, please refer to FIG. 5A and FIG. 5B. In FIG. 5A, the package file update rule PFUR comprises four fields: the update item UI, the execution account EA, the process PR, and the package file PF. Taking the second group of package file update rule PFUR as an example, the update item Ul corresponds to "KB*", the execution account EA corresponds to "LocalSystem", the process PR corresponds to "dism.exe", and the package file PF corresponds to "% ProgramFiles %\CUAssistant\Download\Windows10.0-KB*-x64.cab".

In FIG. 5A, the process update rule PUR comprises three fields: the update item Ul, the execution account EA, and the process PR. Taking the second group of process update rules PUR as an example, its update item Ul corresponds to "SecurityUpdate", execution account EA corresponds to "LocalSystem", and process PR corresponds to "% WINDIR %\ ServiceProfiles\NetworkService\AppData\Local\Temp\mpam-*.exe".

In FIG. 5B, the system service update rule SSUR comprises three fields: update item Ul, execution account EA, and system service SS. Taking the second group of system service update rules SSUR as an example, its update item Ul corresponds to "QualityUpdate", execution account EA corresponds to "LocalSystem", and system service SS corresponds to "DoSvc".

In FIG. 5B, the command line update rule CLUR comprises three fields: update item UI, execution account EA, and command line CL. For example, the update item Ul of the command line update rule CLUR corresponds to "ProgramPackageUpdate", the execution account EA corresponds to "LocalSystem", and the command line CL corresponds to "% WINDIR %\ System32\svchost.exe-k wsappx-p-s AppXSvc".

In the present embodiment, when the processor 33 determines that the pending event corresponds to the system update event (i.e., an update event that conforms to the update rules). Then, the processor 33 executes the updated execution file or command corresponding to the pending event.

In the present embodiment, the processor 33 can add the executable files generated by the pending event to the allowlist 300 based on a security setting.

In some embodiments, the automatic system updating device 3 can set security settings based on different usage environments to determine update events based on different trust levels. Specifically, the security setting corresponds to one of a plurality of security levels (for example: high security level, medium security level, low security level), and each of the security levels corresponds to different allowlist update judgments.

It shall be appreciated that the processor 33 can also set different update rule compliance ratios for different security levels (for example: the update rule compliance ratio is set to 100%, 80%, or 50%).

In some embodiments, the processor 33 verifies a system account executing the at least one pending event. Next, in response to the system account complying with a system permission (for example, the system account "LocalSystem", the system account "LocalService"), the processor 33 compares the pending event with the update rules to calculate an update rule compliance ratio. Finally, the processor 33 determines whether the at least one pending event corresponds to the system update event based on the update rule compliance ratio and the security setting.

For example, when the security setting corresponds to the highest level, the processor 33 needs to determine that the pending event completely complies with the update rules (for example: complies with all fields in the package file update rule PFUR) before collecting the update results.

For another example, when the security setting corresponds to the medium level, the processor 33 needs to determine that some update characteristics are met (for example: only the fields of the process PR and the package file PF in the package file update rule PFUR are met) before collecting the update results.

For another example, when the security setting corresponds to a low level and, processor 33 needs to determine that some update characteristics are met (for example: only the fields of the execution account EA and the package file PF in the package file update rule PFUR are met) before collecting the update results.

In some embodiments, when the security setting corresponds to the highest level (for example: the first security level), the processor 33 needs to determine that the update rules are fully complied with before collecting the update results. In addition, the automatic system updating apparatus 3 can directly add the at least one executable file generated corresponding to the pending event into the allowlist 300 after executing the present update.

In some embodiments, when the security setting corresponds to the medium level (for example: the second security level), the processor 33 needs to determine that some update characteristics are met (for example: 80% of the behavioral characteristics are met) before collecting the update results. In addition, after executing the present update, the processor 33 first puts the generated executable files into the update watch list for monitoring, and the processor 33 adds the executable files to the allowlist 300 after a period of time has passed and it is confirmed that there is no problem.

In some embodiments, when the security setting corresponds to a low level (for example: the third security level), the processor 33 needs to determine that some update characteristics are met (for example: 50% of the behavioral characteristics are met) before collecting the update results. In addition, the processor 33 may not add the generated executable files to the allowlist 300 after executing the present update.

In some embodiments, the processor 33 can further determine whether it is a major system update that comprises an environment repairing image file (e.g., Winre.wim), obtain the plurality of mapped executable files included by mounting the environment repairing image file, and add them to the allowlist to update the allowlist 300 before the running system is replaced. Specifically, the processor 33 determines whether the at least one pending event belongs to a major system update event. Next, in response to the at least one pending event belonging to the major system update event, the processor 33 mounts an environment repairing image file (e.g., Winre.wim) corresponding to the at least one pending event and scans the complete updated system file contained therein. Finally, the processor 33 adds a plurality of mapping executable files included in the environment repairing image file to the allowlist 300.

In some embodiments, when adding the allowlist 300, the processor 33 further generates a file fingerprint corresponding to each the executable file to avoid misjudgment caused by malicious software forging file names. Specifically, the processor 33 calculates a file fingerprint corresponding to the executable file based on each the executable file generated by the pending event. Next, the processor 33 adds the file fingerprint corresponding to each the executable file to the allowlist 300. File fingerprinting refers to using, for example, the MD5 message digest algorithm to determine whether the executable file has been modified or corrupted during the download process.

As can be seen from the above description, the automatic system updating apparatus 3 provided by the present disclosure determines whether a pending event corresponds to a system update event by analyzing the behavioral characteristics of the pending event. Next, the automatic system updating apparatus 3 provided by the present disclosure can execute the update execution file or command corresponding to the pending event. In addition, the automatic system updating apparatus 3 provided by the present disclosure can add the executable files generated by the pending event to the allowlist based on the security setting, so that it can be passed through the allowlist check when the system executes the at least one executable file later. Since the automatic system updating apparatus 3 provided by the present disclosure can identify system updates and automatically update the allowlist, it solves the shortcomings of the conventional technology.

Next, the specific operation of the second embodiment will be described in detail below. In short, in addition to the operations performed in the first embodiment, in the second embodiment, the processor 33 can directly determine whether at least one pending event intercepted from a file system belongs to a major system update event based on a plurality of update rules.

Next, in response to the at least one pending event belonging to the major system update event, the processor 33 mounts and scans an environment repairing image file (e.g., Winre.wim) corresponding to the at least one pending event, wherein the environment repairing image file contains a complete updated system, the updated system comprises a plurality of mapping executable files and has not yet overwritten the running system. Finally, the processor 33 adds the mapping executable files to the allowlist.

In some embodiments, the processor 33 may further add the executable files generated corresponding to at least one pending event to the allowlist based on a security setting.

In some embodiments, the security setting corresponds to one of a plurality of security levels, and each of the security levels corresponds to an allowlist update judgment.

In some embodiments, when the security setting corresponds to a first security levels of the security levels, the processor 33 further performs the following operations: in response to mounting and scanning the environment repairing image file (for example: Winre.wim), the processor 33 adds the mapping executable files included in the environment repairing image file to the allowlist.

In some embodiments, when the security setting corresponds to a second security levels of the security levels, the processor 33 further performs the following operations: in response to mounting and scanning the environment repairing image file (for example: Winre.wim), the processor 33 adds the generated mapping executable files to an update watch list, and adds the update watch list to the allowlist after monitoring the update watch list for a time interval.

In some embodiments, when the security setting corresponds to a third security levels of the security levels, the processor 33 further performs the following operations: in response to mounting and scanning the environment repairing image file (for example: Winre.wim), the processor 33 may not add the mapping executable files generated by the at least one pending event to the allowlist.

In some embodiments, the processor 33 further performs the following operations. The processor 33 obtains a plurality of historical system update events from the file system. The processor 33 extracts the historical behavior characteristics from each of the historical system update events to generate the updated rules.

In some embodiments, the processor 33 determines whether the at least one pending event belongs to the major system update event further comprises the following operations: verifying a system account executing the at least one pending event; in response to the system account complying with a system permission, comparing the at least one pending event with the update rules to calculate an update rule compliance ratio; and determining whether the at least one pending event belongs to the major system update event based on the update rule compliance ratio and the security setting.

In some embodiments, the processor 33 further performs the following operations: based on the environment repairing image file (for example: Winre.wim) generated by the at least one pending event, mounting its image file and scanning the included executable files, and calculating a file fingerprint corresponding to each of the executable files; and adding the file fingerprint of each of the executable files to the allowlist.

In some embodiments, the update rules comprise at least one of a process update rule, a system service update rule, a command line update rule, and a package file update rule or a combination thereof. In addition to the aforesaid steps, the second embodiment can also execute all the operations and steps of the automatic system updating apparatus 3 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

Figure 6:
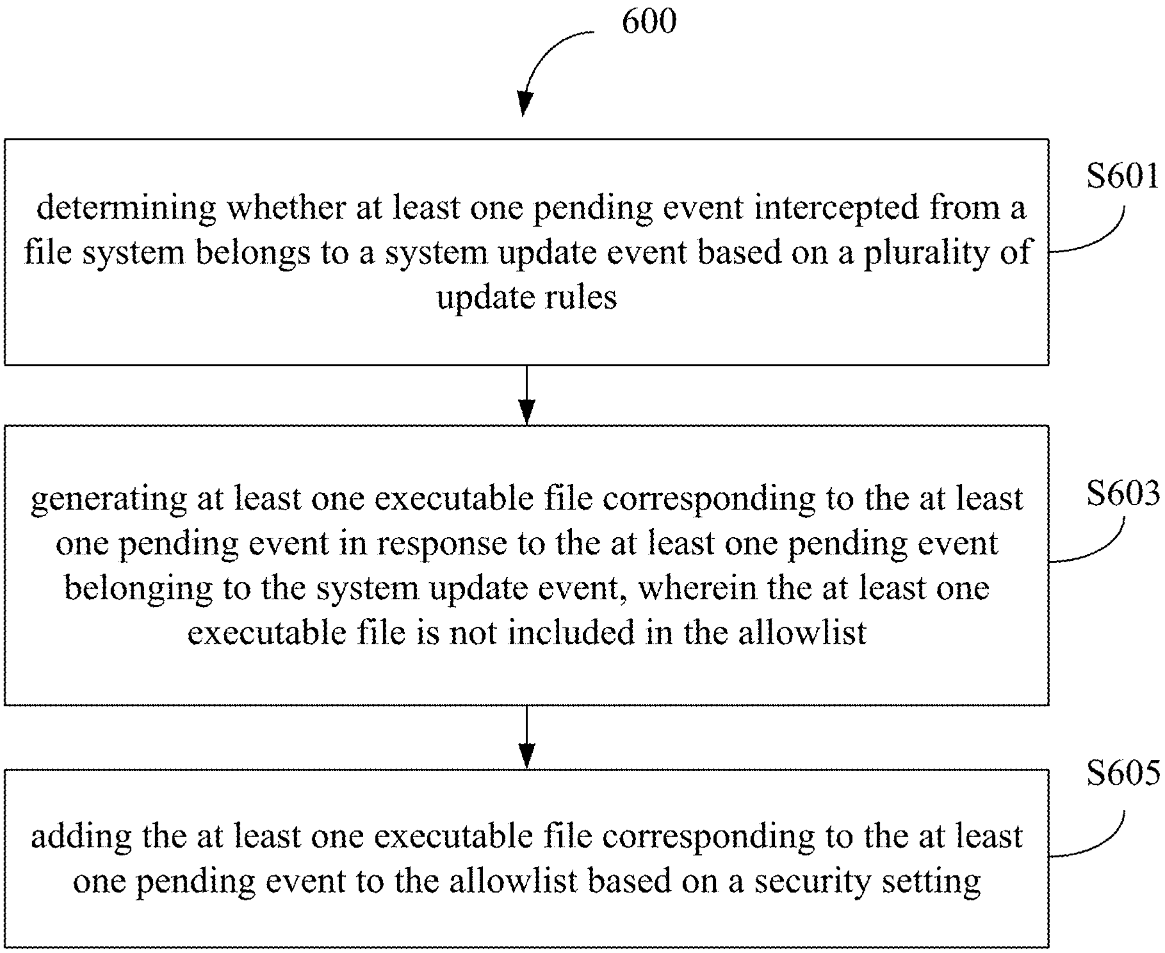
FIG. 6 is a partial flowchart depicting an automatic system updating method of the third embodiment.

A third embodiment of the present disclosure is an automatic system updating method and a flowchart thereof is depicted in FIG. 6. The automatic system updating method 600 is adapted for an electronic apparatus (e.g., the automatic system updating apparatus 3 of the first embodiment). The electronic device stores an allowlist, such as the allowlist 300 described in the first embodiment. The automatic system updating method 600 performs system update and updates the allowlist through steps S601 to S607.

In the step S601, the electronic apparatus determines whether at least one pending event intercepted from a file system belongs to a system update event based on a plurality of update rules.

Next, in the step S603, the electronic apparatus generates at least one executable file corresponding to the at least one pending event in response to the at least one pending event belonging to the system update event, wherein the at least one executable file is not included in the allowlist.

Finally, in the step S605, the electronic apparatus adds the at least one executable file corresponding to the at least one pending event to the allowlist based on a security setting.

In some embodiments, wherein the security setting corresponds to one of a plurality of security levels, and each of the security levels corresponds to an allowlist update judgment.

In some embodiments, wherein when the security setting corresponds to a first security level of the security levels, and the automatic system updating method 600 further comprising the following steps: adding the at least one executable file generated by the at least one pending event to the allowlist.

In some embodiments, wherein when the security setting corresponds to a second security level of the security levels, and the automatic system updating method 600 further comprising the following steps: adding the generated at least one executable file to an update watch list; and adding the at least one executable file to the allowlist after monitoring the update watch list for a time interval.

In some embodiments, wherein when the security setting corresponds to a third security level of the security levels, and the automatic system updating method 600 further comprising the following steps: not adding the at least one executable file generated by the at least one pending event to the allowlist.

In some embodiments, the automatic system updating method 600 further comprises the following steps: obtaining a plurality of historical system update events from the file system; and extracting the historical behavior characteristics from each of the historical system update events to generate the update rules.

In some embodiments, the automatic system updating method 600 further comprises the following steps: determining whether the at least one pending event belongs to a major system update event; in response to the at least one pending event belonging to the major system update event, executing an update execution file or command corresponding to the at least one pending event to generate an environment repairing image file (e.g., Winre.wim) corresponding to the at least one pending event, the mapping file has a complete updated system including a plurality of mapping executable files, and has not yet overwritten the running system; adding the mapping executable files to the allowlist.

In some embodiments, the step of determining whether the at least one pending event belongs to the system update event further comprises the following steps: verifying a system account executing the at least one pending event; in response to the system account complying with a system permission, comparing the at least one pending event with the update rules to calculate an update rule compliance ratio; and determining whether the at least one pending event belongs to the system update event based on the update rule compliance ratio and the security setting.

In some embodiments, the automatic system updating method 600 further comprises the following steps: calculating a file fingerprint corresponding to each of the at least one executable file based on the at least one executable file; and adding the file fingerprint corresponding to each of the at least one executable file to the allowlist.

In some embodiments, the update rules comprise at least one of a process update rule, a system service update rule, a command line update rule, and a package file update rule or a combination thereof.

In addition to the aforesaid steps, the third embodiment can also execute all the operations and steps of the automatic system updating apparatus 3 set forth in the first embodiment and the second embodiment, have the same functions, and deliver the same technical effects as the first embodiment and the second embodiment. How the third embodiment executes these operations and steps, has the same functions, and delivers the same technical effects will be readily appreciated by those of ordinary skill in the art based on the explanation of the first embodiment and the second embodiment. Therefore, the details will not be repeated herein.

According to the above descriptions, the automatic system updating technology (at least including the apparatus and the method) provided by the present disclosure determines whether a pending event corresponds to a system update event by analyzing the behavioral characteristics of the pending event. Then, the automatic system updating technology provided by the present disclosure can execute the executable files or command corresponding to the pending event. In addition, the automatic system updating technology provided by the present disclosure can add the executable files generated by the pending event to the allowlist based on the security settings, so that when the system subsequently executes the at least one executable file, the executable file can be passed through the allowlist check. Since the automatic system updating technology provided by the present disclosure can identify system updates and automatically update the allowlist, it solves the shortcomings of the conventional technology.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An automatic system updating apparatus, comprising:

a storage, being configured to store an allowlist; and a processor, being electrically connected to the storage, and being configured to perform operations comprising:

determining whether at least one pending event intercepted from a file system belongs to a system update event based on a plurality of update rules;

generating at least one executable file corresponding to the at least one pending event in response to the at least one pending event belonging to the system update event, wherein the at least one executable file is not included in the allowlist; and adding the at least one executable file to the allowlist based on a security setting;

wherein the operation of determining whether the at least one pending event belongs to the system update event further comprises the following operations:

verifying a system account executing the at least one pending event;

in response to the system account complying with a system permission, comparing the at least one pending event with the update rules to calculate an update rule compliance ratio; and determining whether the at least one pending event belongs to the system update event based on the update rule compliance ratio and the security setting.

2. The automatic system updating apparatus of claim 1, wherein the security setting corresponds to one of a plurality of security levels, and each of the security levels corresponds to an allowlist update judgment.

3. The automatic system updating apparatus of claim 2, wherein when the security setting corresponds to a first security level of the security levels, the processor further performs the following operations:

adding the at least one executable file generated by the at least one pending event to the allowlist.

4. The automatic system updating apparatus of claim 2, wherein when the security setting corresponds to a second security level of the security levels, the processor further performs the following operations:

adding the generated at least one executable file to an update watch list; and adding the at least one executable file to the allowlist after monitoring the update watch list for a time interval.

5. The automatic system updating apparatus of claim 2, wherein when the security setting corresponds to a third security level of the security levels, the processor further performs the following operations:

not adding the at least one executable file generated by the at least one pending event to the allowlist.

6. The automatic system updating apparatus of claim 1, wherein the processor is further configured to perform the following operations:

obtaining a plurality of historical system update events from the file system; and extracting a historical behavior characteristics from each of the historical system update events to generate the update rules.

7. The automatic system updating apparatus of claim 1, wherein the processor is further configured to perform the following operations:

determining whether the at least one pending event belongs to a major system update event;

in response to the at least one pending event belonging to the major system update event, mounting and scanning an environment repairing image file generated from executing an update execution file or command corresponding to the at least one pending event; and adding a plurality of mapping executable files included in the environment repairing image file to the allowlist.

8. The automatic system updating apparatus of claim 1, wherein the processor is further configured to perform the following operations:

calculating a file fingerprint corresponding to each of the at least one executable file based on the at least one executable file; and adding the file fingerprint corresponding to each of the at least one executable file to the allowlist.

9. The automatic system updating apparatus of claim 1, wherein the update rules comprise at least one of a process update rule, a system service update rule, a command line update rule, and a package file update rule or a combination thereof.

10. An automatic system updating apparatus, comprising:

a storage, being configured to store an allowlist; and a processor, being electrically connected to the storage, and being configured to perform operations comprising:

determining whether at least one pending event intercepted from a file system belongs to a major system update event based on a plurality of update rules;

in response to the at least one pending event belonging to the major system update event, mounting and scanning an environment repairing image file generated from executing an update execution file or command corresponding to the at least one pending event; and adding a plurality of mapping executable files extracted from the environment repairing image file to the allowlist, wherein the mapping executable files are not included in the allowlist.

11. The automatic system updating apparatus of claim 10, wherein the processor is further configured to perform the following operations:

adding the mapping executable files corresponding to the at least one pending event to the allowlist based on a security setting.

12. The automatic system updating apparatus of claim 11, wherein the security setting corresponds to one of a plurality of security levels, and each of the security levels corresponds to an allowlist update judgment.

13. The automatic system updating apparatus of claim 12, wherein when the security setting corresponds to a first security level of the security levels, the processor further performs the following operations:

adding the mapping executable files generated by the at least one pending event to the allowlist.

14. The automatic system updating apparatus of claim 12, wherein when the security setting corresponds to a second security level of the security levels, the processor further performs the following operations:

adding the mapping executable files to an update watch list; and adding the mapping executable files to the allowlist after monitoring the update watch list for a time interval.

15. The automatic system updating apparatus of claim 12, wherein when the security setting corresponds to a third security level of the security levels, the processor further performs the following operations:

not adding the mapping executable files generated by the at least one pending event to the allowlist.

16. The automatic system updating apparatus of claim 10, wherein the processor is further configured to perform the following operations:

obtaining a plurality of historical system update events from the file system; and extracting a historical behavior characteristics from each of the historical system update events to generate the update rules.

17. The automatic system updating apparatus of claim 11, wherein the operation of determining whether the at least one pending event belongs to the major system update event further comprises the following operations:

verifying a system account executing the at least one pending event;

in response to the system account complying with a system permission, comparing the at least one pending event with the update rules to calculate an update rule compliance ratio; and determining whether the at least one pending event belongs to the major system update event based on the update rule compliance ratio and the security setting.

18. The automatic system updating apparatus of claim 10, wherein the processor is further configured to perform the following operations:

calculating a file fingerprint corresponding to each of the mapping executable files; and adding the file fingerprint corresponding to each of the mapping executable files to the allowlist.

19. The automatic system updating apparatus of claim 10, wherein the update rules comprise at least one of a process update rule, a system service update rule, a command line update rule, and a package file update rule or a combination thereof.

* * * * *